United States Patent  [15] 3,643,621
Newnes  [45] Feb. 22, 1972

[54] LUMBER STACKER STICK PLACER

[72] Inventor: Ray William Newnes, P.O. Box 8, Salmon Arm, British Columbia, Canada

[22] Filed: Aug. 14, 1970

[21] Appl. No.: 63,858

[30] Foreign Application Priority Data

Aug. 27, 1969 Canada....................................60567

[52] U.S. Cl. ..........................................214/8.5 K, 221/298
[51] Int. Cl...........................................................B65g 59/06
[58] Field of Search..........................214/8.5 A, 8.5 K, 8.5 R; 221/251, 297, 298

[56] References Cited

UNITED STATES PATENTS 2,701,065   2/1955   Bertel..........................214/8.5 R UX

FOREIGN PATENTS OR APPLICATIONS 73,387   6/1960   France.................................214/8.5 K Primary Examiner—Gerald M. Forlenza
Assistant Examiner—George F. Abraham
Attorney—Lawrence I. Field

[57] ABSTRACT

The apparatus of this invention consists of a number of stick-placing units, each unit consisting of a vertically disposed elongated magazine-type container for containing sticks, a holding mechanism for holding the sticks in the magazine, and movable means for transporting the lowermost stick from the magazine and placing it upon a layer of lumber. The units are positioned in places where sticks are required and all the units are operated simultaneously by an operating mechanism. The operation of the apparatus id controlled by limit switches, and initiation of an operating cycle is controlled by a limit switch on a lumber stacker associated with the stick placer.

11 Claims, 5 Drawing Figures

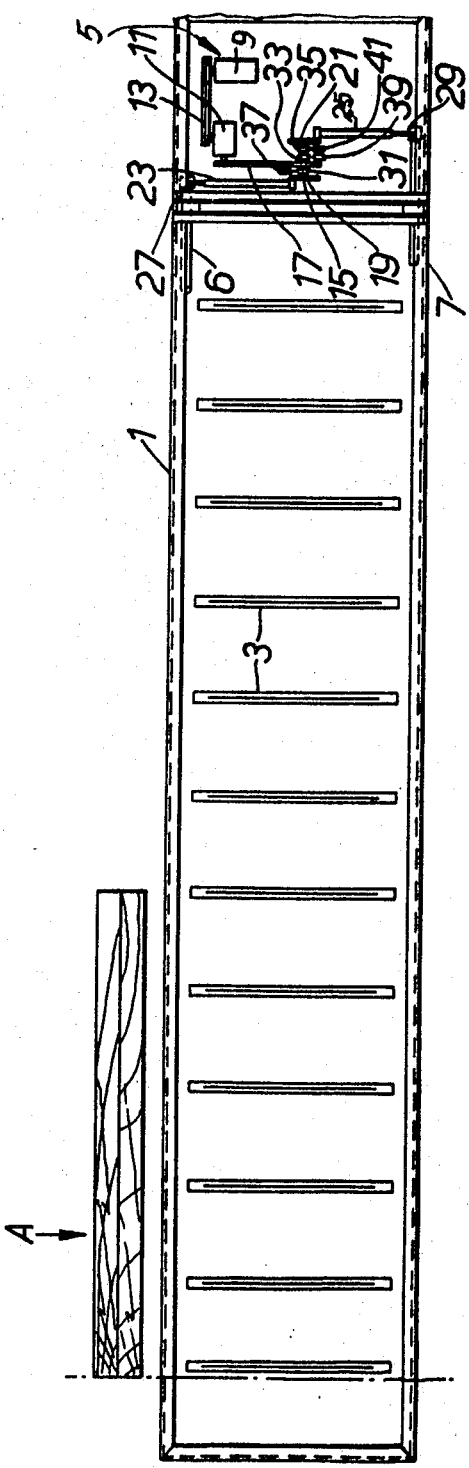

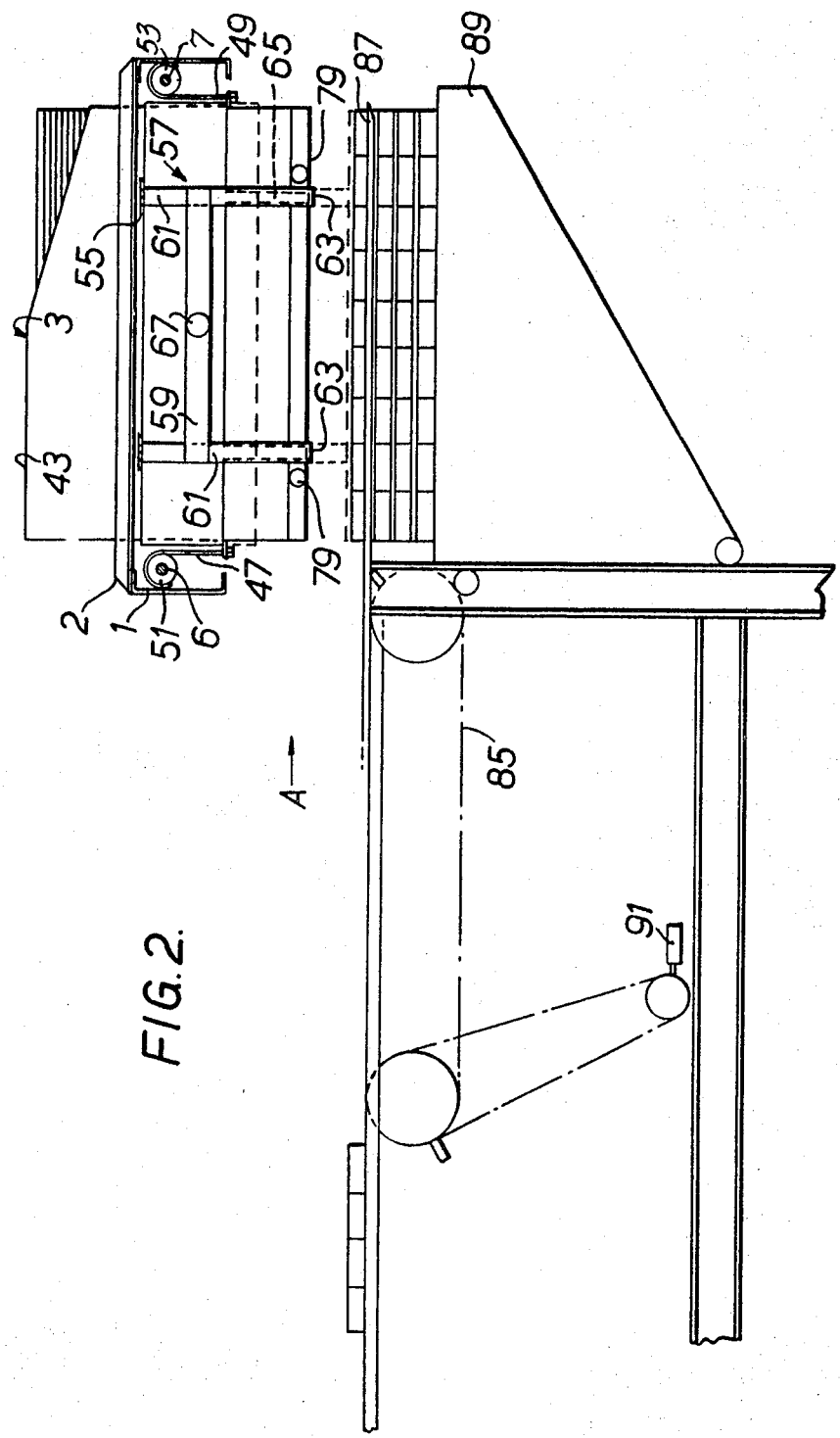

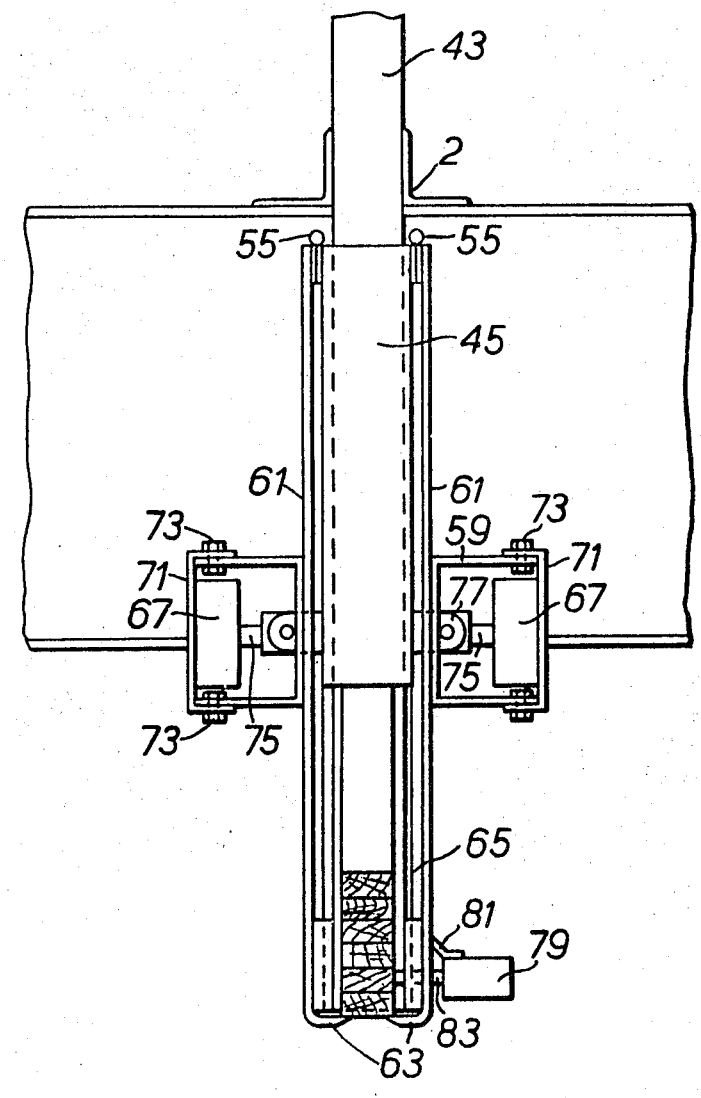
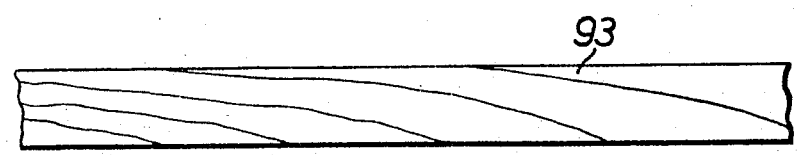

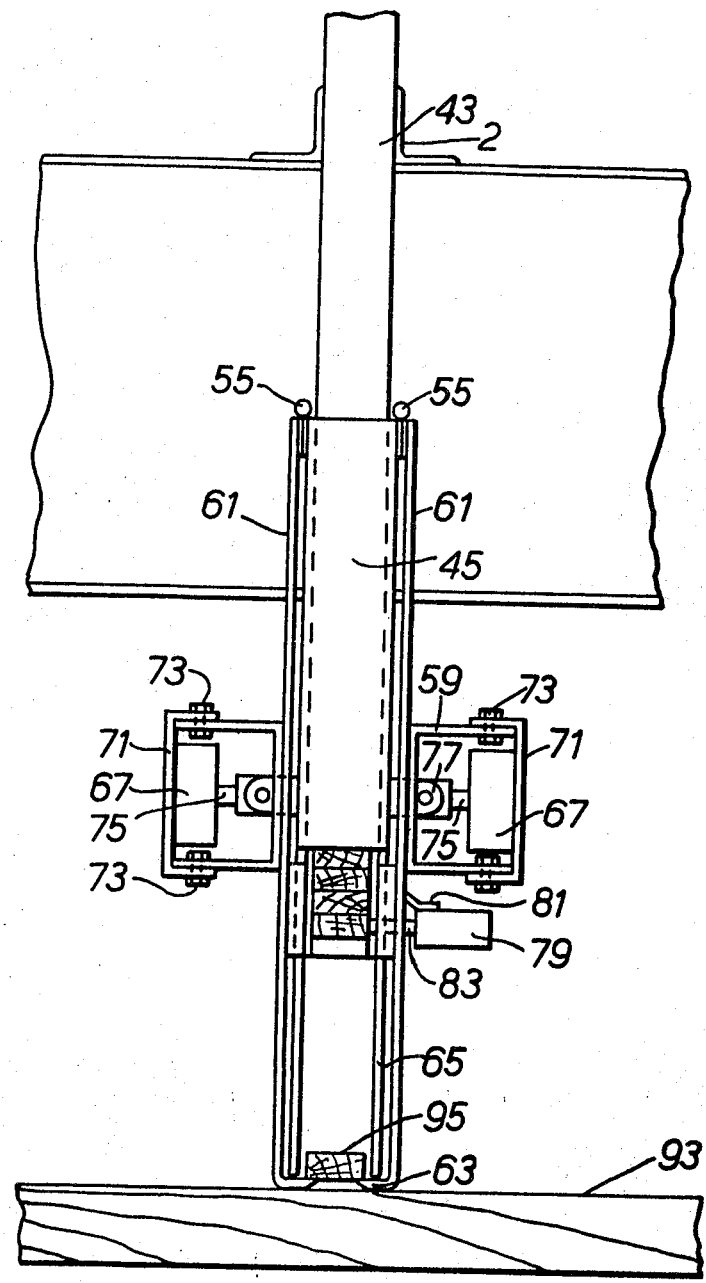

LUMBER STACKER STICK PLACER

This invention relates to an apparatus for placing sticks between tiers or layers of lumber as they are being stacked.

BACKGROUND OF THE INVENTION

After lumber has left a mill, it is normally collected by a lumber stacker of which there are various well-known types, this stacker collecting the lumber into a layer of parallel boards, and placing them in a stack having one layer on top of the next.

Freshly cut lumber contains a large amount of moisture, and it is preferable to place spacing sticks between each layer of lumber to so provide passages for circulation of air for lumber-drying purposes. The weight of the lumber in the stack helps to retain the cut lumber in a flat unwarped condition while drying.

SUMMARY OF THE INVENTION

The apparatus of this invention consists generally of a number of stick-placing units, each unit consisting of a vertically disposed elongated magazine-type container, hereinafter referred to as a magazine, for containing sticks, a holding mechanism for holding the sticks in the magazine, and movable means for transporting the lowermost stick from the magazine and placing it upon a layer of lumber. The units are positioned in places where sticks are required and all the units are operated simultaneously by an operating mechanism. The operation of the apparatus is controlled by limit switches, and initiation of an operating cycle is controlled by a limit switch on a lumber stacker associated with the stick placer.

BRIEF DESCRIPTION OF DRAWINGS

FIG. 1 is a schematic view of the stick-placing apparatus of this invention.

FIG. 2 is a schematic end elevational view showing one of the stick-placing units of the apparatus of FIG. 1 in its operative position beside a lumber stacker.

FIG. 3 is a schematic elevational view of one unit of the apparatus of FIG. 1.

FIGS. 4 and 5 are schematic views showing the unit of FIG. 3 in different operating positions.

DESCRIPTION OF PREFERRED EMBODIMENT

Figure 5:
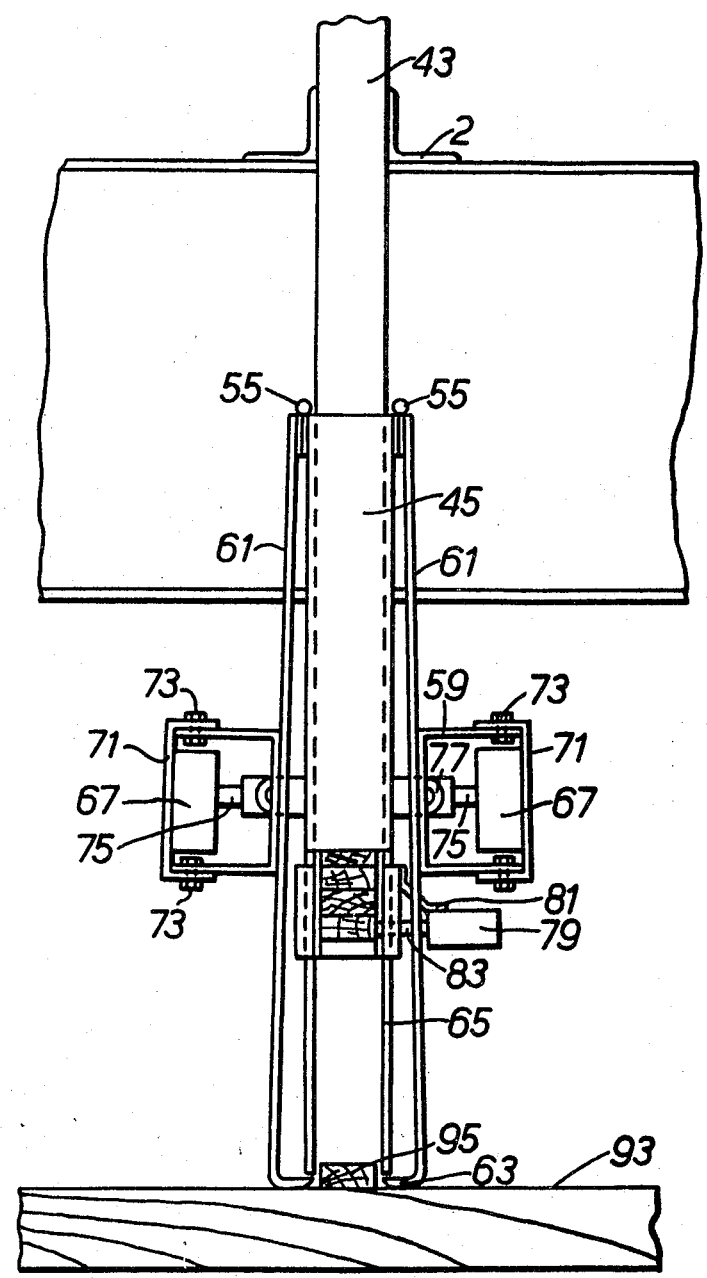

Referring mainly to FIG. 1, the apparatus consists of a frame 1 in which are mounted, by suitable brackets 2, a number of stick-placing units 3 and an operating mechanism 5.

The frame 1 is suitably supported, in a manner not shown, either from the ground or from a lumber stacker with which the apparatus is associated.

Each unit 3 is operated through operating shafts 6 and 7 which are suitably supported in bearings (not shown) along the length of the frame 1.

The operating mechanism 5 consists of a rotary motor 9, and a gearbox 11 driven from the motor 9 through a drive 13 such as a V-belt or roller chain. A shaft 15 mounted on a suitable framework and bearings (not shown) to frame 1 is driven by a V-belt or roller chain drive 17 from the gearbox 11. Crank 19 is mounted on one end of the shaft 15 and a crank 21 is mounted on the other end of shaft 15, each crank being connected respectively to connecting rods 23 and 25. These connecting rods 23 and 25 provide oscillatory movement to shafts 6 and 7 through cranks 27 and 29 which are respectively secured to one end of each of shafts 6 and 7. The length of throw of cranks 19 and 21 are less than the throw of cranks 27 and 29 such that one revolution of shaft 15 produces approximately a 180° oscillation of shafts 6 and 7.

Cams 31, 33 and 35 are provided on shaft 15 for operating limit switches 37, 39 and 41 respectively, which control the operation of the apparatus.

Each stick-placing unit 3 as shown in detail in FIGS. 2, 3, 4 and 5 consists of a stick-holding magazine 43 having an outer housing 45 vertically movable on the magazine 43. Roller chains 47 and 49 are secured respectively to the transverse ends of the outer housing 45 and pass over sprockets 51 and 53 which are secured on shafts 6 and 7.

Secured to the outer housing 45 are hinges 55 which support H-shaped members 57. Each H-shaped member 57 is comprised of a crosspiece 59 and two uprights 61 which have short inwardly facing fingers 63 at their lower ends. Elongated bars 65 project from the lower end of the outer housing 45 in positions adjacent the uprights 61.

Each crosspiece 59 is of U-shaped cross section and has an actuator, such as an air cylinder 67, positioned in its central region on a mounting plate 71 which is attached to the crosspiece 59 by bolts 73. The piston rod 75 associated with the air cylinder 67 is pivotally attached to outer housing 45 through mounting brackets 77 which are welded or otherwise suitably secured to the outer housing 45. Actuation of the air cylinders 67 will therefore pivot the H-shaped member 57 about the hinges 55 so moving apart the fingers 63.

At the lower end of the magazine 43 are provided air cylinders actuators 79 which are secured through brackets 81 to the lower end of the magazine 43 by welding or other equivalent holding means. The piston rods 83 of each associated air cylinder 79 project towards the magazine 43 such that during operation of the air cylinder 79, the remote ends of each piston rod 83 can be forced into contact with a lowermost stick so retaining the supply of sticks inside the magazine.

Referring specifically to FIG. 2, a portion of a lumber stacker is shown schematically, the lumber being collected in a layer by the chain mechanism 85, the layer of lumber being moved forwardly by fingers 87 and placed onto a stack which is being formed on a self-height-adjusting table 89. A limit switch 91 is controllable by a stop (not shown) on the drive mechanism of the lumber stacker, to initiate operation of the stick-placing apparatus.

Arrow A in FIG. 1 indicates the direction of movement of the stacks of lumber from the lumber stacker.

The operation of the stick-placing apparatus is as follows:

A layer of lumber is placed by the lumber stacker onto the table 89. Upon withdrawal of the fingers 87, the limit switch 91 is activated and operation of the operating mechanism 5 begins. Details of the electrical circuitry are not provided as it is understood that any type of suitable limit switch and relay system can be used. The outer housing 45 is lowered through the rotation of shafts 6 and 7, one stick 95 being carried downwardly on the fingers 63. The remaining sticks in the magazine are held in place by the piston rods 83 pushing against the lowermost stick in the magazine. When the fingers 63 are in close proximity to the layer of lumber depicted as 93, the limit switch 41 is closed and, through suitable circuitry and electrically controlled air valves, operates air cylinders 67 such that the H-shaped members 57 are pivoted outwardly so releasing the stick 95 onto the layer of lumber 93. The outer housing 45 then moves upwardly under the action of the operating mechanism 5 and, near the top of the travel of the outer housing, the limit switch 41 is opened by cam 35 so permitting the H-shaped members to return to their vertical position in which the fingers 63 are in a proximity close enough to prevent a stick from passing between them. When the outer housing 45 is almost at the top of its travel, limit switch 39 is activated by cam 33 and through suitable circuitry and electrically controlled air valves the piston rods 83 are retracted from the lowermost stick in the magazine so permitting the stack of sticks to fall onto the fingers 63. Immediately following this operation, the limit switch 39 is again operated and activates the air cylinders 79 to push the piston rods 83 against the second stick from the bottom of the magazine. When the outer housing 45 reaches the top of its travel, the limit switch 37 is activated by cam 31 to stop the operating mechanism 5.

The stick-placing unit is then ready for its next operation, the lowermost stick from the magazine being retained on the fingers 63 while the remainder of the sticks in the magazine are held by pressure on the lowermost stick in the magazine by piston rods 83.

It is also possible to construct a stick-placing unit which has only one H-shaped member 57. For satisfactory operation of such a modified unit the fingers 63 on the single member 57 are made of a longer length than the fingers shown in the Figures, and the stroke of the air cylinder 67 is increased to an adequate length to be able to withdraw the fingers 63 from beneath the stack of sticks. A saving in cost and weight is achieved by utilizing such a structure.

It is thus seen that the stick-placing apparatus of this invention can accurately place sticks in a required predetermined position utilizing a simple construction which is not prone to failure and is easily and inexpensively maintained.

It is also understood that, although the apparatus has been described with electrical and pneumatic controls, any other suitable type of control system could be utilized such as hydraulic or mechanical.

I claim:

1. A stick-placing apparatus consisting of a plurality of units, each unit consisting of a fixed magazine, a holding mechanism at the lower end of the magazine for holding a supply of sticks in the magazine, and vertically movable means for lowering a stick onto a layer of lumber, the vertically movable means consisting of an outer housing around the magazine, a member on one side of the outer housing, said member having stick-holding fingers, and a piston and cylinder actuator between the outer housing and said member such that the member can be moved away from said magazine to release a stick from the fingers.

2. An apparatus as in claim 1, wherein the vertically movable means are operated by a pair of spaced parallel shafts and an elongated flexible member between each shaft and the vertically movable means such that upon rotation of each shaft the associated flexible member is wrapped around the shaft and vertically moves the vertically movable means.

3. An apparatus as in claim 1, wherein each unit is arranged substantially parallel to its adjacent unit and each vertically movable means is operated by a pair of spaced parallel shafts, an elongated flexible member between each shaft and each vertically movable means such that upon rotation of each shaft the associated flexible member is wrapped around the shaft and vertically moves each vertically movable means simultaneously.

4. An apparatus as in claim 2, wherein an operating mechanism operates the shafts through a crank mechanism such that the shafts operate with an oscillatory motion.

5. An apparatus as in claim 3, wherein an operating mechanism operates the shafts through a crank mechanism such that the shafts operate with an oscillatory motion.

6. An apparatus as in claim 2, wherein an operating mechanism operates the shafts and limit switches are provided for control of the holding mechanism and the operating mechanism.

7. An apparatus as in claim 3, wherein an operating mechanism operates the shafts and limit switches are provided for control of the holding mechanism and the operating mechanism.

8. A stick-placing apparatus consisting of a plurality of units, each unit consisting of a fixed magazine, a holding mechanism at the lower end of the magazine for holding a supply of sticks in the magazine, and vertically movable means for lowering a stick onto a layer of lumber, the vertically movable means consisting of an outer housing around the magazine, a member on each side of the outer housing, each member having stick-holding fingers, and a piston and cylinder actuator between the outer housing and each member, such that the members can be moved apart to release a stick from the fingers.

9. A stick-placing apparatus consisting of a plurality of units, each unit consisting of a fixed magazine, a holding mechanism at the lower end of the magazine for holding a supply of sticks in the magazine, and vertically movable means for lowering a stick onto a layer of lumber, the vertically movable means consisting of an outer housing around the magazine, a member on one side of the outer housing, said member being of H-shaped configuration and being pivotally mounted to the housing by the upper ends of the uprights of the H-shape, the lower ends of the uprights being angled to form stick-holding fingers, elongated bars depending from the housing to a position adjacent to the fingers to laterally retain a stick in place between the fingers, and an operating means associated with each member such that the member can be moved away from said magazine to release a stick from the fingers.

10. A stick-placing apparatus consisting of a plurality of units, each unit consisting of a fixed magazine, a holding mechanism at the lower end of the magazine for holding a supply of sticks in the magazine, and vertically movable means for lowering a stick onto a layer of lumber, the vertically movable means consisting of an outer housing around the magazine, a member on each side of the outer housing, each member being of H-shaped configuration and being pivotally mounted to the housing by the upper ends of the uprights of the H-shape, the lower ends of the uprights being angled to form stick-holding fingers, elongated bars depending from the housing to a position adjacent to the fingers to laterally retain a stick in place between the fingers, and an operating means associated with each member such that the members can be moved apart to release a stick from the fingers.

11. A stick-placing apparatus consisting of a plurality of units, each unit consisting of a fixed magazine, a holding mechanism at the lower end of the magazine for holding a supply of sticks in the magazine, and vertically movable means for lowering a stick onto a layer of lumber, the vertically movable means consisting of an outer housing around the magazine, a member on one side of the outer housing, said member being of H-shaped configuration and being pivotally mounted to the housing by the upper ends of the uprights of the H-shape the lower ends of the uprights being angled to form stick-holding fingers, elongated bars depending from the housing to a position adjacent to the fingers to laterally retain a stick in place between the fingers, and a piston and cylinder actuator between the outer housing and said member such that the member can be moved away from said magazine to release a stick from the fingers.

* * * * *